United States Patent [19]

Menez et al.

[11] Patent Number: 5,351,291
[45] Date of Patent: Sep. 27, 1994

[54] ADAPTIVE ECHO CANCELLATION METHOD AND DEVICE FOR IMPLEMENTING SAID METHOD

[75] Inventors: Jean Menez, Cagnes Sur Mer; Michele Rosso, Saint Jeannet; Paolo Scotton, Vence, all of France

[73] Assignee: International Business Machines Corporation, Armonk, N.Y.

[21] Appl. No.: 927,690

[22] Filed: Aug. 7, 1992

[30] Foreign Application Priority Data

Sep. 6, 1991 [EP] European Pat. Off. ........ 91480144.4

[51] Int. Cl.$^5$ .............................................. H04M 9/00
[52] U.S. Cl. ................................... 379/410; 379/411; 370/32.1
[58] Field of Search ................. 379/410, 406, 411; 370/32.1

[56] References Cited

U.S. PATENT DOCUMENTS

| | | | |
|---|---|---|---|
| 4,577,071 | 3/1986 | Johnston et al. | 379/410 |
| 4,677,668 | 6/1987 | Ardalan et al. | 379/410 X |
| 4,894,820 | 1/1990 | Miyamoto et al. | 370/32.1 |
| 5,062,102 | 10/1991 | Taguchi | 379/410 X |

FOREIGN PATENT DOCUMENTS 8802582 7/1988 PCT Int'l Appl. ............ H04B 3/23

OTHER PUBLICATIONS

IEEE Trans. On Circuits & Systems, vol. 38, No. 10, Oct. 1990, pp. 1693–1698.
Electrical Communication, vol. 59, No. 3, 1985, pp. 338–344.

Primary Examiner—James L. Dwyer
Assistant Examiner—C. Smith
Attorney, Agent, or Firm—Joscelyn G. Cockburn

[57] ABSTRACT

The echo cancellation method includes starting with an arbitrary set of echo filter coefficients. The coefficients are first sequentially re-estimated using a fast converging method.

These operations are repeated a predefined number of times, and then the coefficients estimation is switched to a low converging but more precise method. In addition, an adaptive threshold is being defined and readjusted and all filter coefficients lower than said threshold are being discarded.

Finally, sampling time boundaries are adaptively defined based on non-discarded filter coefficients with reference to said threshold, and in such a way the final echo cancellation algorithm is adaptive to echo variations (backtracking algorithm).

9 Claims, 8 Drawing Sheets

ADAPTIVE ECHO CANCELLATION METHOD AND DEVICE FOR IMPLEMENTING SAID METHOD

The present invention deals with digital signal transmission over telephone lines in networks including two-to-four wire conversions, and it deals more particularly with a method and device for cancelling echo signals inherent to this kind of networks.

BACKGROUND OF THE INVENTION

Everyone in the communications technology area is aware of the increasing interest in multi-media networks and systems. As far as communications are concerned, multi-media processing means merging and distributing, without impairment, text, images, and speech over a same high speed network covering very long distances. This implies efficiently converting all three kinds of information into digitally encoded data and then vehiculating those data over a common network. Needless to mention that several important technical problems have to find solutions prior to one being able to provide acceptable networks.

Echo is one of those problems, and echo cancellation the solution. Several echo cancelers are already available. They, however, are not yet fully satisfactory from a cost/efficiency standpoint, particularly when multiple echoes are involved.

To make the above statements clearer, one should remind the basic principles. Speech signals issuing from the telephone set are first transmitted, at least over a short distance, in their analog form and through a bi-directional two-wire line. Said line is then split into two mono-directional lines (four wires overall). One mono-directional line for incoming signals, the other for outgoing signals. Analog-to-Digital (A/D) conversion of the signal are operated over the outgoing speech signal, to enable further transmission over a high speed digital network. Then correlative Digital-to-Analog (D/A) conversion need being performed at the receiving end prior to the signal being vehiculated to the destined telephone set over a bi-directional 2-wire line. Therefore, at least at both ends of the network, two-to-four and four-to-two wire conversions must be performed. These are conventionally achieved through so-called hybrid transformers. Due to unavoidable hybrid load mismatching throughout the voice frequency bandwidth parts of outgoing speech are fedback to their originating telephone user. These are the so-called echoes which do disturb significantly the communication between end-users.

Obviously, each hybrid transformer on the speech path may generate an echo, which worsens the situation. Simple echoes are already difficult to track and cancel, therefore, needless to insist on the complexity of the problem when dealing with multiple echoes and/or when dealing with variable environments due to PBX's.

Echo cancelers are made using adaptive digital filters monitoring the digital signals over both mono-directional lines, processing said signals to generate an echo replica and subtracting said replica from the actual echo polluted signal. The echo replica generating filter (so-called echo filter) coefficients are dynamically estimated and adjusted to tune the filter. The coefficients estimation computing load is fairly heavy, which is a main drawback with current signal processors.

The higher the number of required coefficients, the higher the filter complexity. In addition, one should remember that the echo filter should be designed to dynamically synthesize the echo path impulse response $h(t)$. The filter coefficients may be defined as samples of said impulse response. The longer the impulse response, or more particularly the significant portion of said impulse response, the higher the number of coefficients to be considered.

In addition, and especially in a variable network environment, the coefficients computation should be fast enough to render the system operable satisfactorily. This could be achieved, at least partially, by increasing the signal processor power. But in practice, to optimize efficiency versus complexity, one needs optimizing the coefficients computation.

Otherwise, the computing workload involved might render the whole echo canceler cost prohibitive.

Different methods have been proposed for tracking the significant portions of echo path impulse response, or for computing echo filter coefficients. They all either lack efficiency on adaptiveness or lack efficiency in their convergence toward the right coefficients value.

One object of this invention is to provide a fully adaptive method to track and compute the most significant echo filter coefficients directly through dynamic threshold considerations, to adapt to changing network environment as required.

These and other objects, characteristics and advantages of the present invention will be explained in more detail in the following, with reference to the enclosed figures, which represent a preferred embodiment thereof.

DESCRIPTION OF PREFERRED EMBODIMENT

Figure 1:
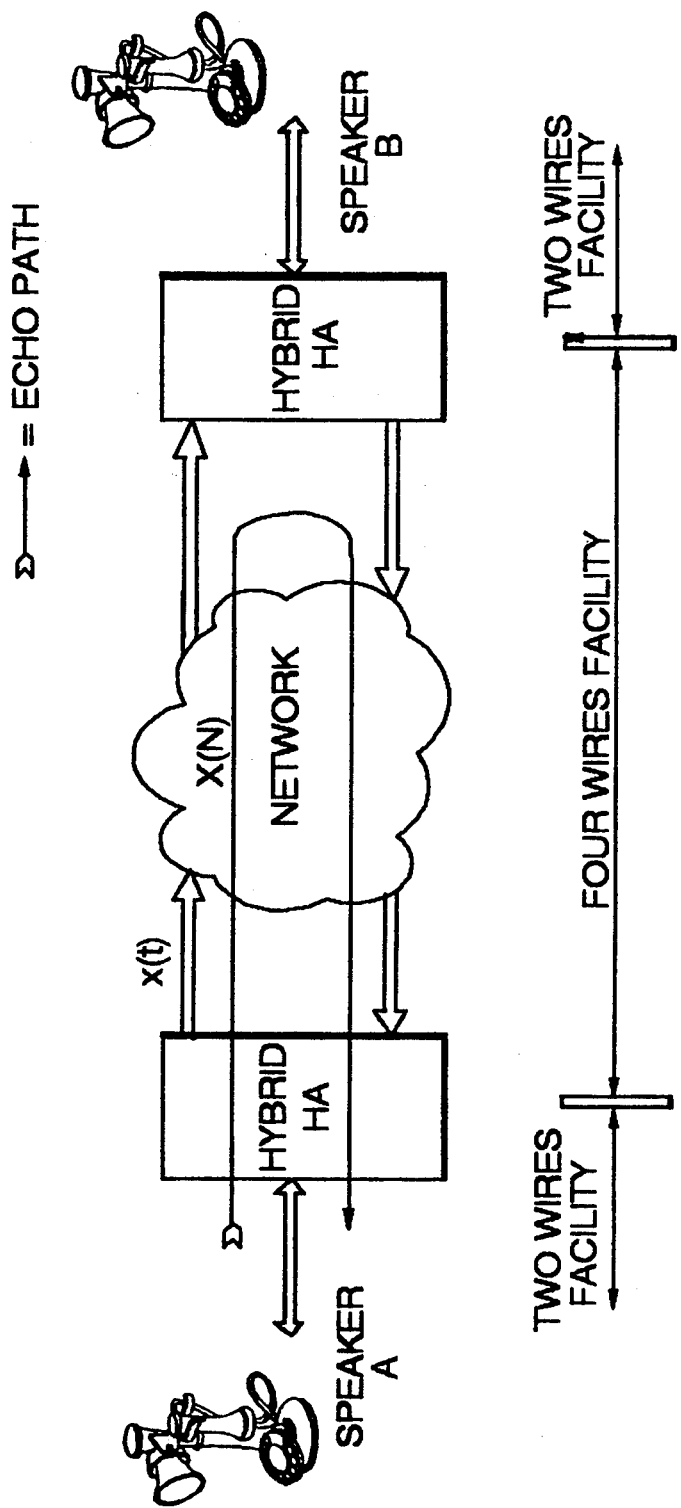
FIG. 1 is a schematic representation of a single echo path

FIG. 1 shows a schematic representation of a single echo path. The speech signal issuing from speaker A over a 2-wire bi-directional facility, is vehiculated through hybrid transformer (HA) as a signal $x_t$ over the upper uni-directional line. Said signal is normally sampled and digitally coded into a flow of data $x(n)$ (n standing for the $n^{th}$ sample), and transmitted over a digital network, toward speaker B. Prior to reaching the hybrid transformer (HB), the signal is converted into analog form. Due to impedance loading mismatching throughout the speech frequency spectrum, a portion of the signal $x(t)$ reaching hybrid transformer HB, is fed back toward speaker A. This is a primary echo, and one may easily understand how disturbing this echo may be to speaker A. Actually, even more disturbing are multiple echoes (see echo 1 and echo 2 in FIG. 2).

Figure 2:
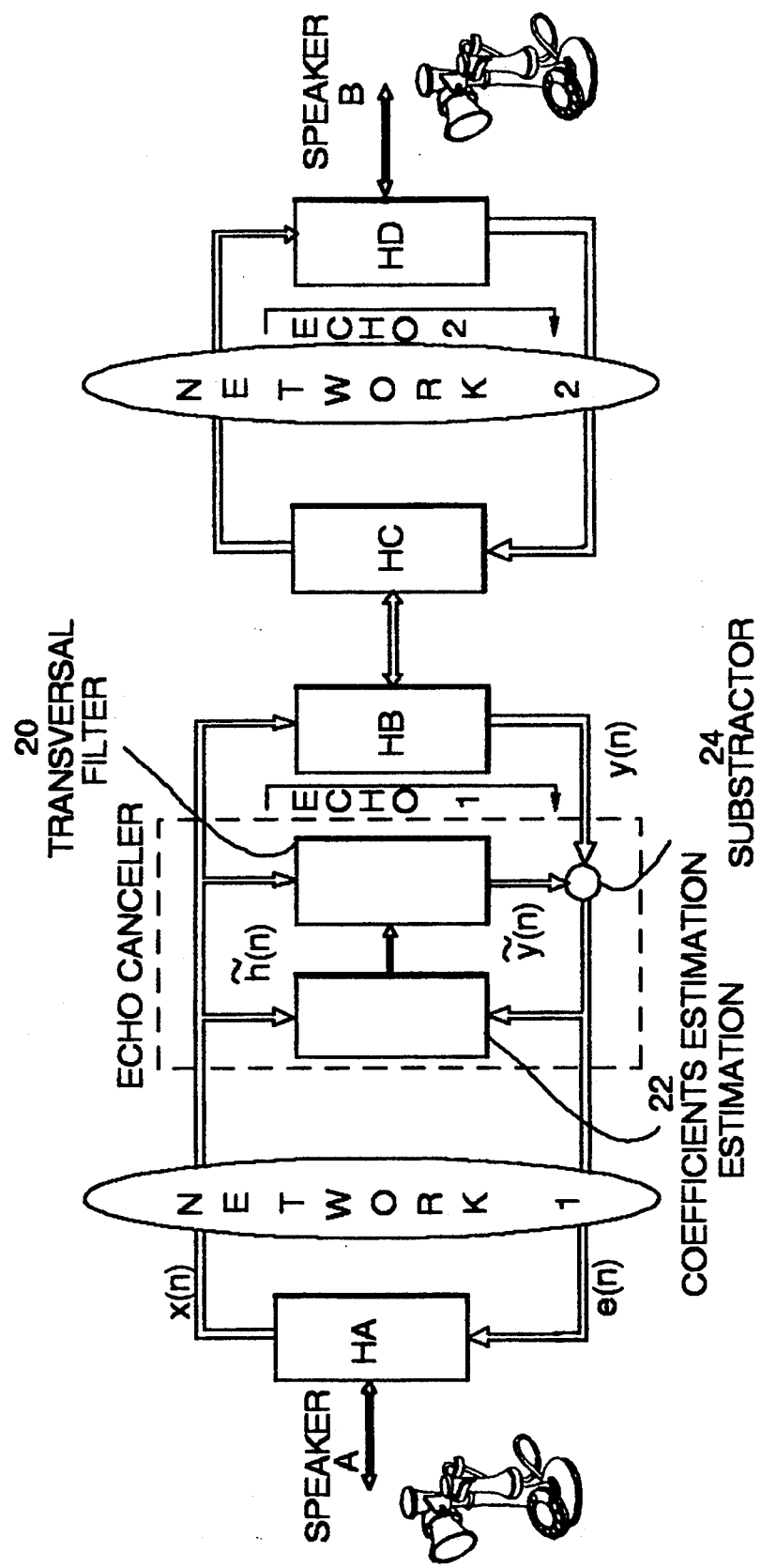
FIG. 2 shows a block diagram of a network with an echo canceler

FIG. 2 shows a block diagram of a conventional Echo Canceler (echo-filter) architecture. The system includes a transversal digital filter (20) fed with the signal samples $x(n)$ (which might be referred to as signal $x(n)$). The filter (20) is an adaptive filter the coefficients of which are computed in a so-called coefficients estimation device (22) fed with both the $x(n)$ signal and the residual signal $e(n)$.

The filter (20) is made to provide an estimated echo replica signal $\tilde{y}(n)$.

In theory, subtracting $\tilde{y}(n)$ from $y(n)$ in a subtractor (24) should cancel the echo. The remaining signal is an error signal $e(n)$. The essential problem to be solved here, lies with the coefficients estimation no matter whether the echo is simple or multiple.

Figure 3:
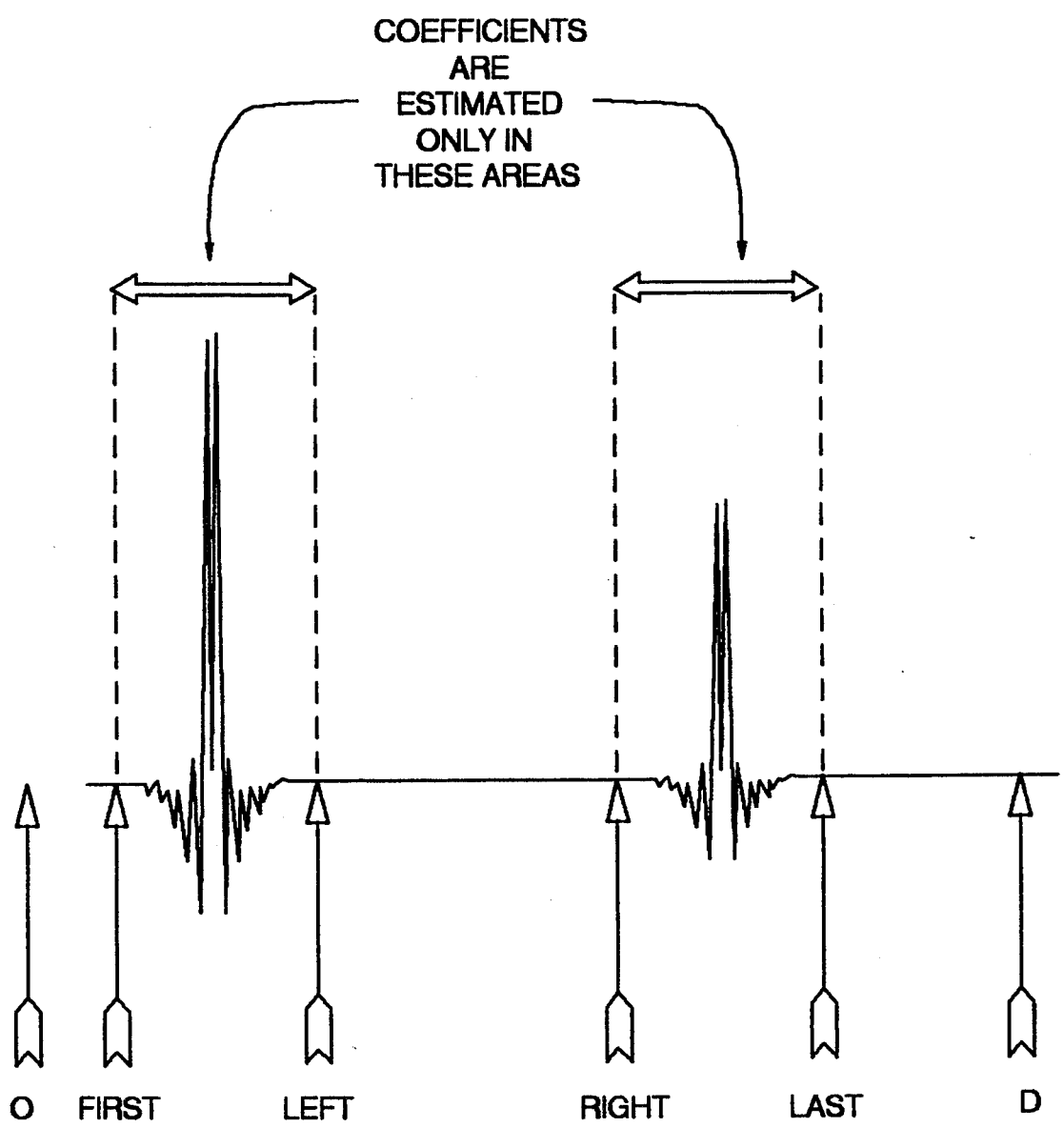
FIG. 3 shows a double echo representation

A double echo impulse response is shown in FIG. 3. The main problem lies with determining the significant (amplitudewise) coefficients without knowing the real shape of the impulse response they should be derived from.

The method of this invention includes dynamically computing both, threshold values to distinguish significant over insignificant coefficient values, and setting correlative limits (see: first, left, right and last fur a double echo situation, in FIG. 3).

Permanently adjusting said limits enable saving a lot of processing load and therefore considerably improving over known methods, including over so-called flat delay determining methods (see European Application no 854300381 filed on Oct. 30, 1985).

Figure 4:
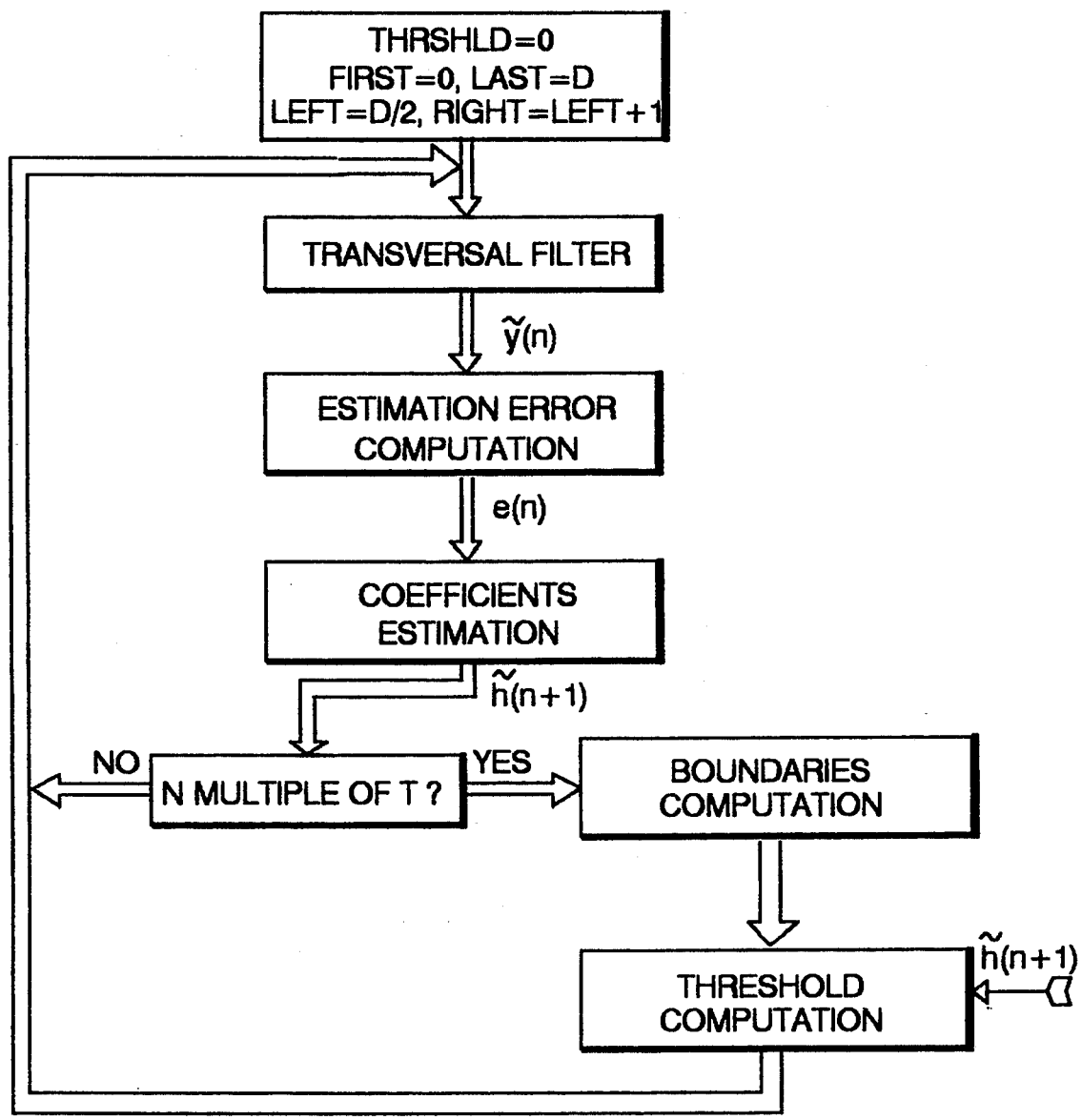
FIG. 4-8 are flow-charts for implementing the echo cancellation features of this invention.

Assuming speaker B is not active, which is determined using a conventional voice activity detector (not shown in the figures provided in this application), then the overall process may be summarized as shown in the flow-chart of FIG. 4.

A coefficient threshold value (Thrshld) is initialized to zero, and so-called relative sampling time limits or coefficient boundaries parameters are respectively initially set to the following values:

First=0
Last=D, with D being a predefined large number
Left=D/2
Right=Left+1

In other words, the original transversal filter will cover the whole distance zero to D.

The transversal filter is set to operate with an arbitrary set of coefficients defined conventionally and provide an estimated echo replica $\tilde{y}(n)$. The error $e(n)$ is derived therefrom. A new set of coefficients is estimated (computed) providing for each previous coefficient $\tilde{h}(n)$, a new estimated coefficient $\tilde{h}(n+1)$. These operations are repeated for a number of sampling times up to a predefined number T (e.g. T=1000). Once T=1000, boundaries computations are performed and followed by Threshold computation. The whole process may start again with the newly computed Thrshld, First, Last, Left and Right parameters. Any filter coefficient outside those limits is simply dropped.

One may also notice one of the flexibilities of this method, enabling redefining dynamically even the number of coefficients itself.

Figure 5:
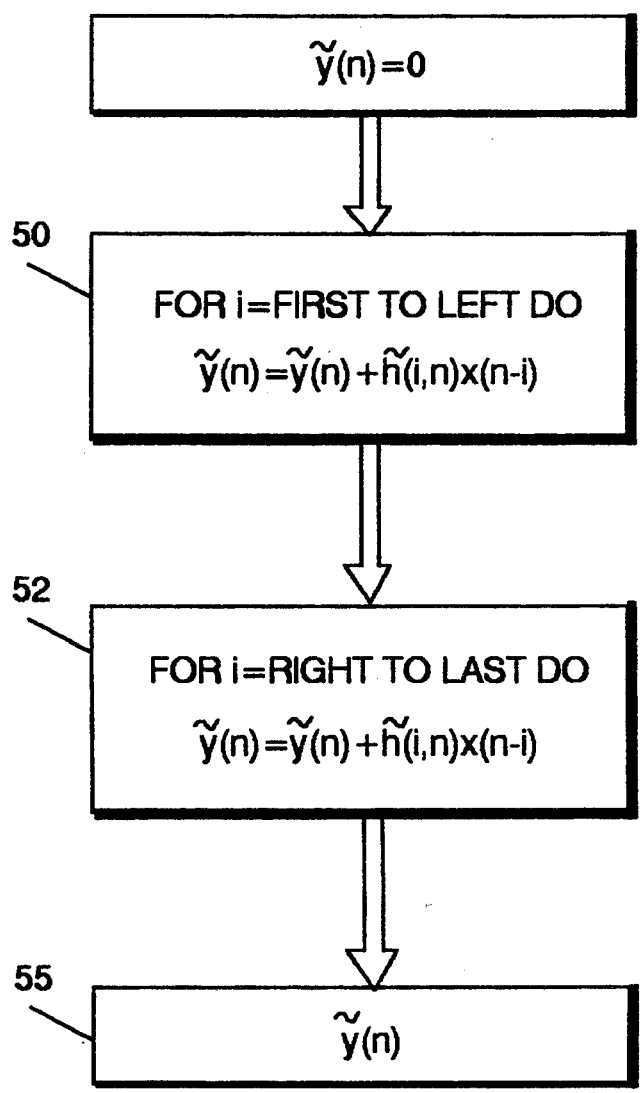

Represented in FIG. 5 is a flow-chart of the transversal filter operation. It should first be reminded that, conventionally, if one let $$\{\tilde{h}_i(n), i=0 \ldots D-1\}$$

be the estimation at time n of the set of filter coefficients:

$$\{h_i, i=0 \ldots D-1\}$$

Then, the transversal filtering providing the echo replica estimation $(\tilde{y}(n))$ is according to:

$$\tilde{y}(n) = \sum_{i=0}^{D-1} h_i(n) \cdot x(n-i) \qquad (1)$$

The above operations are performed initially with the initial set of coefficients (technique already used with equalizers) and subsequently with the sets defined through coefficients estimation operations, as disclosed further in this description. But one should already note that only those coefficients located between First and Left and between Right and Last will be considered. This also will be described later on. This explains why the flow-chart of FIG. 5 implementing equation (1) has been split into two main steps (50) and (52).

Each finally estimated echo replica $y(n)$ is subtracted from the echo spoiled (or polluted) signal $y(n)$ to generate the estimation error signal $e(n)$.

Figure 6:
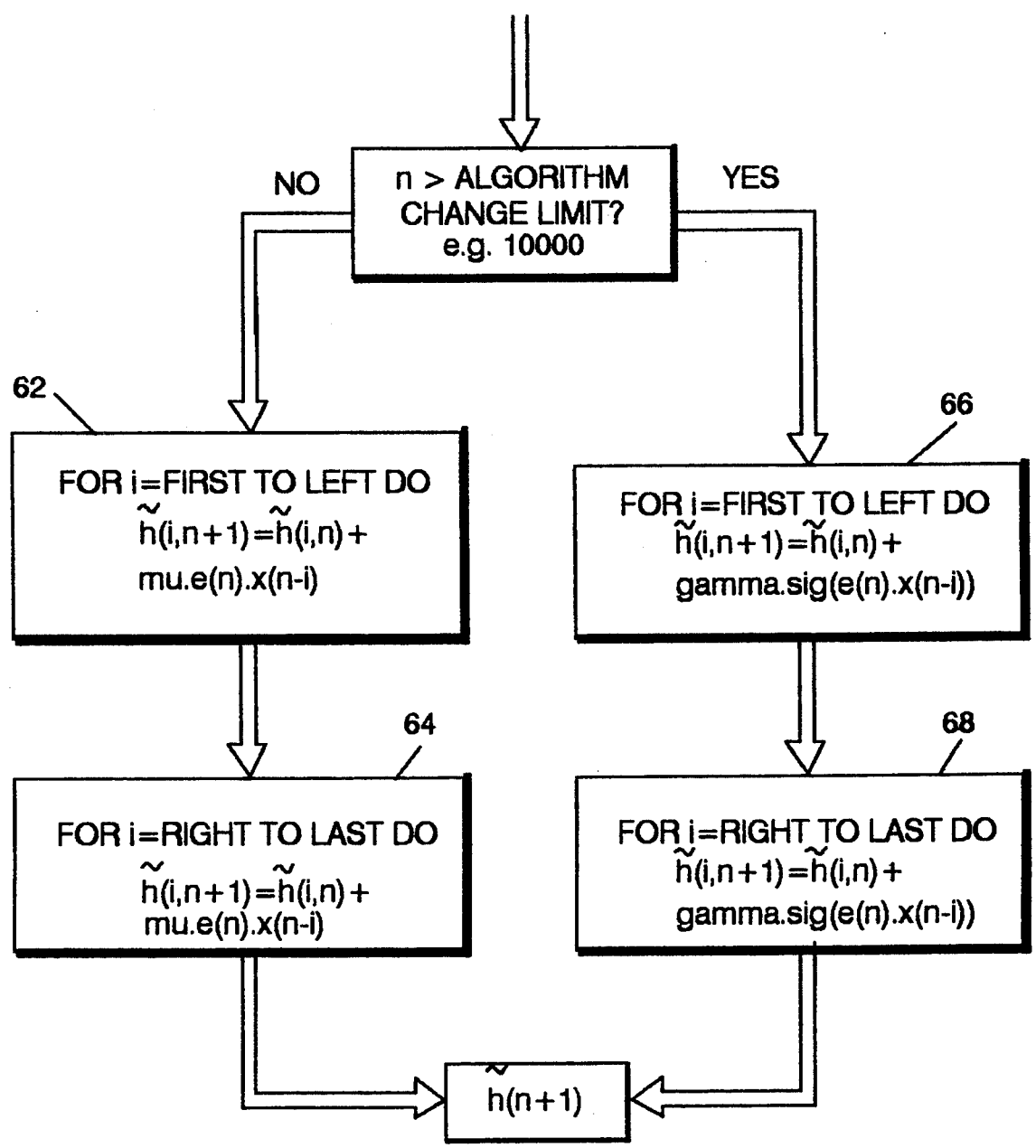

Represented in FIG. 6 is a flow-chart for performing the coefficients estimation step of the invention (see FIG. 4). The coefficients estimation combines two known methods, i.e. the gradient method and the sign method, generally used separately.

The gradient method enables estimating a given filter coefficient $h_i$ at sampling time $n+1$, using nile previous $h_i$ estimated value, through the following expression:

$$\tilde{h}_i(n+1) = \tilde{h}_i(n) + \mu \cdot x(n-i) \cdot e(n)$$

and repeating these operations for the whole set of filter coefficients.

$\mu$ = is a predefined constant defining a convergence rate.

The sign method enables performing filter coefficient computation operations according to:

$$\tilde{h}_i(n+1) = \tilde{h}_i(n) + \gamma \cdot \text{Sign}[e(n) \cdot x(n-i)] \qquad (2)$$

Wherein $\gamma$=gamma, is a predefined constant and the expression Sign [X] stands for the sign of X.

It has been noticed that while the gradient method usually starts rapidly as far as Signal/Noise ratio (S/N) of the process is concerned, it, then, rapidly saturates to a low (S/N).

On the contrary, the sign method may start slowly but goes up to high S/N ratios.

The method implemented in the flow-chart of FIG. 6, combines both methods to take full advantage of both qualities. It starts with the gradient method (see steps 62 and 64), up to a predefined number N of sampling times n (e.g. 10,000) and then switches to the sign method (see steps 66 and 68).

The above combination of methods also provides permanent adjustments to the varying hybrid and network conditions. Also, should the coefficients variations become higher than a given threshold, then the whole coefficients estimation process may start back with the gradient method.

Figure 7:
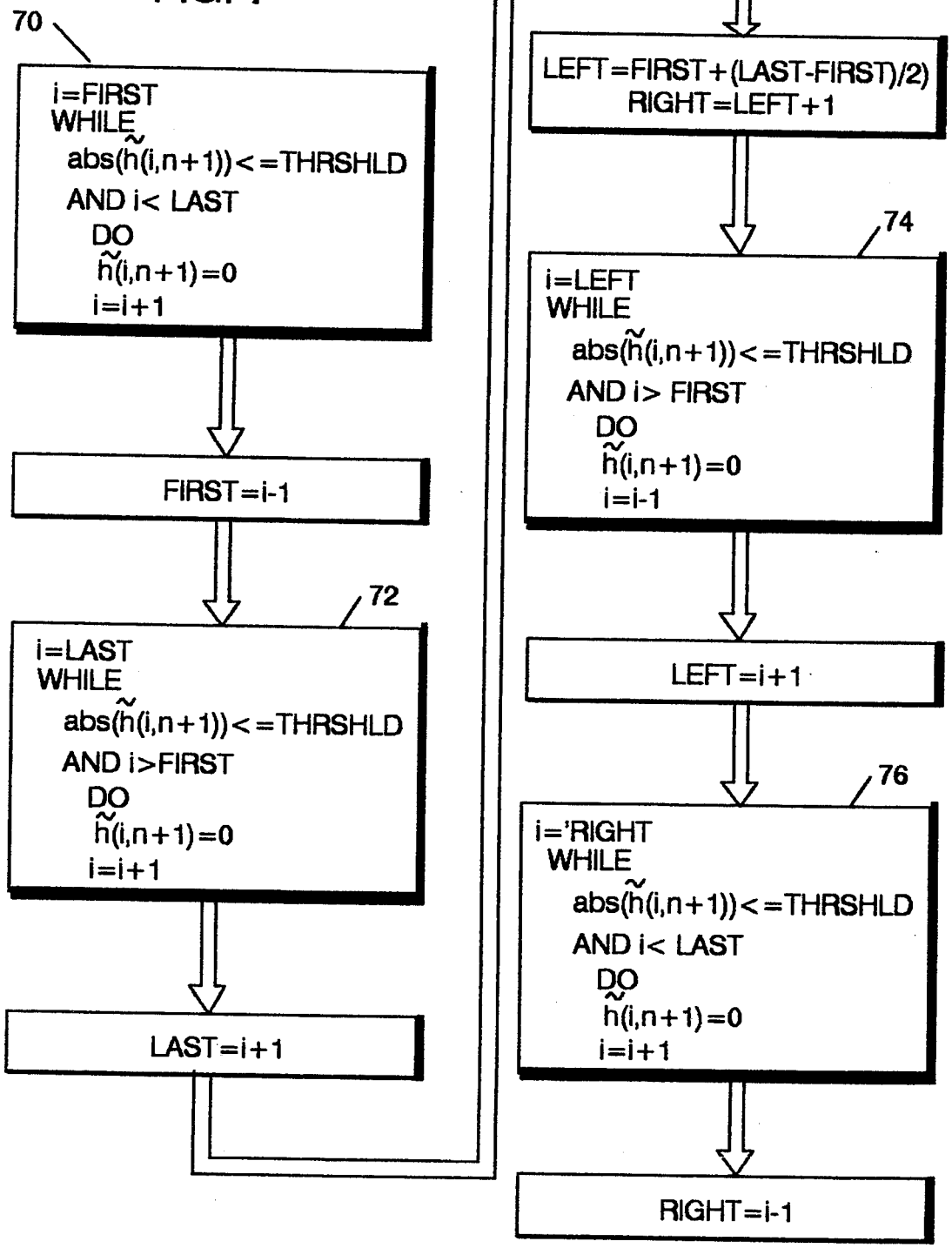

Every multiple of a predefined time interval T (e.g. T=n.1000), the boundaries significant parameters (First, Left, Right and Last) are redefined. This is accomplished according to the flow-chart of FIG. 7. The boundaries are tracked and adjusted through an adaptive scheme based on thresholding considerations over the coefficients magnitudes. The threshold is also adaptively set and permanently adjusted as will be disclosed later. But, assume a threshold value is set, the boundaries tracking is performed as follows: the First and Last boundaries first, and then the Left and Right ones.

To begin with, a computing index i is set equal to the last value of First, the magnitude of coefficient $\tilde{h}_i$ is compared to the Threshold value (Thrshld). As long as $h_i$ is lower than said Threshold, the index i is incremented by one, $\tilde{h}_i$ is set to zero and the process goes on. As soon as the test is negative ($\tilde{h}_i$>Thrshld), the new value First is set equal to i−1 (to allow algorithm backtracking) and stored as a pointer (see 70).

Then, the process starts with i=Last (previously computed Last value), and i is decremented as long as $\tilde{h}_i$ keeps being smaller than Thrshld. When this test becomes negative, Last is set to i−1 (see 72). This is the aim to allow algorithm backtracking.

A similar process is used for setting Left (see 74) and Right (see 76).

Figure 8:
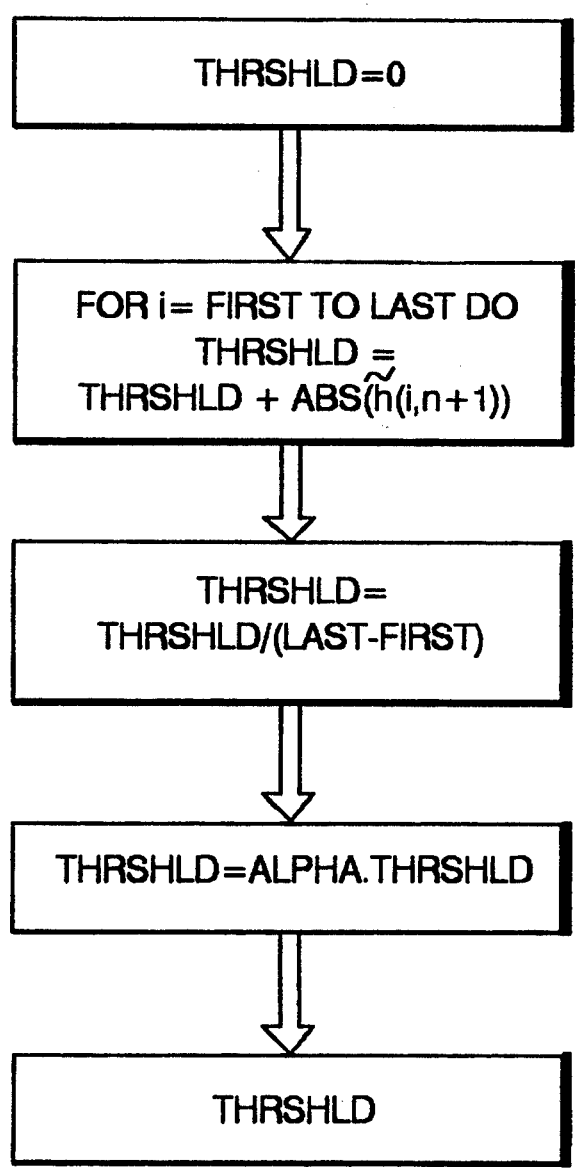

Represented in FIG. 8 is a flow-chart for computing the Thrshld value. It is based on the formula:

$$Thrshld(n+1) = \alpha \frac{\sum_{i=First}^{Last} |\tilde{h}_i(n)|}{Last - First}$$

Wherein $0 < \alpha \leq 1$
and $|\tilde{h}_i(n)|$ stands for magnitude (or abs) of $\tilde{h}_i(n)$.

Different approaches could be used. For instance, one may use different thresholds, one between First and Left and the other between Right and Last, therefore taking into consideration the fact that secondary echoes are generally lower than primary echoes.

Given the above described flow-charts, a man skilled in the art will have no difficulty writing the required (micro) programs for implementing the echo cancellation operations.

We claim:

1. In a telephone system for providing a communication path between a first and a second telephone and having a pair of unidirectional conductors for carrying digital telephone signals in opposite directions between the first and second telephones, first and second bidirectional conductors and first and second hybrid transformers for respectively connecting the said first and second telephones to opposite ends of the said pair of unidirectional conductors to provide a complete signal path between the said first and second telephones, at least one transversal filter having an input connected to one of the said unidirectional conductors and having a plurality of coefficients taps for generating a replica of the echo signal present in the said other unidirectional conductor, and means responsive to the filter output and the signal present on the said other unidirectional conductor for subtracting the replica generated in the filter from the signal present on the said other unidirectional conductor to cancel the echo present in the said other unidirectional conductor, a method for setting the coefficients of the transversal filter comprising the steps:

a) setting a coefficient threshold (Thrshld) to a predefined value;
b) setting initial relative sampling time limits for defining initial coefficient boundaries;
c) setting initial filter coefficients to predefined values;
d) subtracting the echo replica provided by the transversal filter from the signal present on the said other unidirectional conductor and deriving therefrom an updated error signal e(n);
e) deriving a new set of coefficients using the updated error signal e(n) and replacing the filter coefficients with the new set of coefficients;
f) repeating steps d) and e) for a predetermined number of periods T of the digital telephone signal present on the said one unidirectional conductor;
g) after the said predetermined number of periods T redefining the coefficient boundaries based on the current coefficient threshold value and dropping those filter coefficients outside of said threshold to define an updated coefficient set; and
h) computing a new coefficient threshold value for subsequent use in step g) based on said updated coefficient set and repeating steps d) through h).

2. An adaptive digital echo canceling according to claim 1, wherein said coefficient boundaries redefining includes:
testing the magnitude of each estimated coefficient with respect to Thrshld until said estimated coefficient is higher then Thrshld and then backtracking to previous estimated coefficient for boundary defining.

3. An adaptive digital echo canceling method according to claim 1 or 2, wherein said deriving of a new set of estimated coefficients is performed only for coefficients within said redefined coefficient boundaries.

4. An adaptive digital echo canceling method according to claim 3, wherein said deriving a new set of estimated coefficients includes:
generating a set of estimated filter coefficients $\tilde{h}_i$ for the $(n+1)^{th}$ sample time, using a fast converging method;
repeating said fast converging method for a predefined number of times; and then,
switching to a more precise coefficient generating method.

5. An adaptive digital echo canceling method according to claim 4, wherein said fast converging method is the gradient method, and said more precise method is the sign method.

6. An adaptive digital echo canceling method according to claim 1, wherein said initial coefficients boundaries includes:
setting four boundaries initially as follows:
First boundary=zero,
Last boundary=D, with D being a predefined large number,
Left boundary=D/2, and
Right boundary=(D/2)+1,
periodically redefining said boundaries based on current filter coefficient values, with respect to current threshold.

7. An adaptive digital echo canceling method according to claim 6, wherein said redefining coefficient boundaries includes:
a) setting a computing index i to be equal to last value of First boundary;
b) comparing the magnitude of last estimated coefficient value $\tilde{h}_i$ to current threshold;
c) setting said $\tilde{h}_i$ as long as its magnitude is lower than said current threshold;
d) incrementing i and repeating steps b and c;
e) setting First boundary equal to i when $\tilde{h}_i$ becomes higher than said current threshold;
f) setting i equal to last value of Last boundary;
g) comparing $\tilde{h}_i$ to current threshold, setting $\tilde{h}_i$ to zero if it is lower than said current threshold, and decrementing i until $\tilde{h}_i$ becomes higher than said threshold, then setting Last boundary equal to i;

h) setting Left=First+(Last-First)/2 and Right=Left+1;

i) repeating steps f) and g) for Left boundary;

j) repeating steps a) through e) for Right boundary.

8. An adaptive digital echo canceling method according to claim 7, wherein said new threshold coefficient value computing is made according to:

$$Thrshld(n+1) = \alpha \frac{\sum_{i=First}^{Last} |\tilde{h}_i(n)|}{Last - First}$$

Wherein $0 < \alpha \leq 1$
and $|\tilde{h}_i(n)|$ is the magnitude of coefficient $\tilde{h}_i(n)$.

9. An adaptive digital echo canceling method according to claim 7, wherein said new coefficient threshold value computing includes:
computing the coefficients energy;
setting said threshold to be proportional to said energy.

* * * * *